United States Patent [19]
Minohara et al.

[11] Patent Number: 5,402,482
[45] Date of Patent: Mar. 28, 1995

[54] RING TRIP DECIDING CIRCUIT

[75] Inventors: Kazuyuki Minohara, Yokohama; Kenji Takato, Kawasaki, both of Japan

[73] Assignee: Fujitsu Limited, Kawasaki, Japan

[21] Appl. No.: 983,864

[22] PCT Filed: Jul. 7, 1992

[86] PCT No.: PCT/JP92/00863
§ 371 Date: Mar. 5, 1993
§ 102(e) Date: Mar. 5, 1993

[87] PCT Pub. No.: WO93/01676
PCT Pub. Date: Jan. 21, 1993

[30] Foreign Application Priority Data
Jul. 8, 1991 [JP] Japan .................. 3-167088

[51] Int. Cl.⁶ .................. H04M 1/24; H04M 3/00; H04M 1/60; H04M 13/00
[52] U.S. Cl. .................. 379/377; 379/382; 379/7; 379/161; 379/168; 379/184; 379/194
[58] Field of Search .................. 379/7, 27, 32, 161, 379/168, 184, 194, 377, 382

[56] References Cited
U.S. PATENT DOCUMENTS

| | | |
|---|---|---|
| 4,429,185 | 1/1984 | Adrian et al. .................. 379/377 |
| 4,455,456 | 6/1984 | Cochran .................. 379/377 |
| 4,899,372 | 2/1990 | Wahi et al. .................. 379/194 X |

FOREIGN PATENT DOCUMENTS

| | | |
|---|---|---|
| 58-191762 | 12/1983 | Japan . |
| 61-144158 | 7/1986 | Japan . |
| 2-246454 | 10/1990 | Japan . |
| 3-250951 | 11/1991 | Japan . |

*Primary Examiner*—Stephen Chin
*Assistant Examiner*—Paul Loomis
*Attorney, Agent, or Firm*—Staas & Halsey

[57] ABSTRACT

A ring trip deciding method in a ring trip circuit detects voltage change in the on-hook state and the on-hook state of a terminal when the terminal such as telephone set connected to the telephone line is called. The ring trip deciding circuit has a ring trip detecting resistance connected in series with a ringer generator for detecting change of current value depending on the on-hook and off-hook states, a detector for detecting voltage change across the ring trip detecting resistance, a voltage comparator for outputting different values when the threshold value is larger or smaller by comparing a voltage outputted from the detector with the threshold value, a first state latch for latching and outputting different state values depending on different output values of the voltage comparator, a composite state latch for fetching, latching and outputting at least two state values outputted from the first state latch synchronously with a clock, and a state deciding circuit for comparing state values of the composite state latch to detect the on-hook and off-hook states of the terminal.

12 Claims, 11 Drawing Sheets

Fig. 8A

| | L2 | L3 | OR in | RTP |
|---|---|---|---|---|
| QxA | 1 | 1 | 1 | 1 |
| QxB | 1 | x | x | |
| QxC | 1 | x | x | |
| QxD | 1 | x | x | |
| QxE | 1 | x | x | |
| QxF | 1 | x | x | |

Fig. 8B

| | L2 | L3 | OR in | RTP |
|---|---|---|---|---|
| QxA | 0 | 1 | 0 | 0 |
| QxB | 0 | 0 | 0 | |
| QxC | 0 | 0 | 0 | |
| QxD | 0 | 0 | 0 | |
| QxE | 0 | 0 | 0 | |
| QxF | 0 | 0 | 0 | |

Fig. 8C

| | L2 | L3 | OR in | RTP |
|---|---|---|---|---|
| QxA | 0 | 1 | 0 | 0 |
| QxB | 0 | 0 | 0 | |
| QxC | 0 | 0 | 0 | |
| QxD | 0 | 0 | 0 | |
| QxE | 1 | 0 | 0 | |
| QxF | 1 | 1 | 0 | |

Fig. 8D

| | L2 | L3 | OR in | RTP |
|---|---|---|---|---|
| QxA | 0 | 1 | 0 | 1 |
| QxB | 0 | 0 | 0 | |
| QxC | 0 | 0 | 0 | |
| QxD | 1 | 0 | 1 | |
| QxE | 1 | 0 | 0 | |
| QxF | 1 | 1 | 0 | |

Fig. 8E

| | L2 | L3 | OR in | RTP |
|---|---|---|---|---|
| QxA | 0 | 1 | 0 | 1 |
| QxB | 0 | 0 | 0 | |
| QxC | 1 | 0 | 1 | |
| QxD | 1 | 0 | 1 | |
| QxE | 1 | 0 | 0 | |
| QxF | 1 | 1 | 0 | |

Fig. 8F

| | L2 | L3 | OR in | RTP |
|---|---|---|---|---|
| QxA | 0 | 1 | 0 | 0 |
| QxB | 0 | 0 | 0 | |
| QxC | 0 | 0 | 0 | |
| QxD | 0 | 0 | 0 | |
| QxE | 0 | 0 | 0 | |
| QxF | 1 | 1 | 0 | |

Fig. 8G

| | L2 | L3 | OR in | RTP |
|---|---|---|---|---|
| QxA | 0 | 1 | 0 | 0 |
| QxB | 0 | 0 | 0 | |
| QxC | 0 | 0 | 0 | |
| QxD | 0 | 0 | 0 | |
| QxE | 1 | 1 | 0 | |
| QxF | 1 | 1 | 0 | |

Fig. 8H

| | L2 | L3 | OR in | RTP |
|---|---|---|---|---|
| QxA | 0 | 1 | 0 | 0 |
| QxB | 0 | 0 | 0 | |
| QxC | 0 | 0 | 0 | |
| QxD | 0 | 1 | 0 | |
| QxE | 0 | 1 | 0 | |
| QxF | 1 | 1 | 0 | |

RING TRIP DECIDING CIRCUIT

FIELD OF THE INVENTION

The present invention relates to a ring trip deciding circuit for detecting transfer condition from the on-hook state to the off-hook state of a terminal such as a telephone set connected to the telephone line while it is called.

BACKGROUND OF THE INVENTION

The transfer condition from the on-hook state to the off-hook state of a terminal connected to the telephone line while the terminal is called is detected by the ring trip detecting circuit by connecting in series a ring trip circuit detecting resistor to a ringer generator. The voltage change generated by a change of current flowing into the ring trip detecting resistor during transfer between the on-hook state and the off-hook state depending on the response from a terminal is then detected.

However, a current value of the ring trip resistor and a rate of change of such current between the on-hook state and off-hook state are different depending on the condition in a side of load, such as the line length of telephone line and the number of terminals connected. Therefore, the accurate detection of the on-hook and off-hook conditions has been very difficult.

FIG. 1 is an explanatory diagram of a ring trip deciding method.

In FIG. 1, element 10 is a subscriber circuit; element 11 is an equivalent circuit of a telephone set forming a series resonant circuit; element 12 is a ring trip detecting resistance (RS) for detecting a change of current generated depending on the transfer condition between the on-hook state and off-hook state of the telephone set; element 13 is a ring trip detector; element 14 is a ringer generator for generating a low frequency AC voltage for ring trip decision. The letter B indicates a switch that opens for the on-hook condition and closes for the off-hook condition.

Operations of the ring trip deciding method shown in FIG. 1 will be explained hereunder.

The ringer generator 14 outputs an AC voltage superposed on a low frequency (about 20 Hz) DC voltage of −48 V. A current flowing into the ring trip detecting resistance (RS) 12 is detected by a detector 13 as an interterminal voltage, and the detected voltage is outputted to the output point A.

In the on-hook state, a low level AC voltage is outputted from the output point A since a DC element is zero.

In the off-hook state, the switch B in the subsrcriber circuit 10 closes, applying a DC element to the circuit and increasing a current flowing into the ring trip detecting resistance (RS) 12 and an outputting an AC voltage in which an AC element is superposed on the DC element from the output point A.

The on-hook state and off-hook state can be decided by detecting the voltage at the point A, which is different depending on these conditions.

FIGS. 2A and 2B show an example of a conventional ring trip deciding circuit. FIG. 2A shows a ring trip deciding circuit and FIG. 2B shows an output voltage waveform at the point A of the detector 14. In FIG. 2A, element 11 is a ringer generator; element 12 is a ring trip detecting resistance (RS); element 13 is a ring trip circuit for deciding the on-hook and off-hook states; element 14 is a detector for detecting and outputting a voltage change across the ring trip detecting resistance (RS) 12 generated depending on the on-hook state and off-hook state; element 15 is a detecting circuit for detecting a voltage across the ring trip detecting resistance (RE) 12; element 16 is a filter/integrating circuit consisting of R, C circuit for eliminating an AC element of the voltage detected by the detecting circuit 15 and integrating the signal; element 17 is a decision circuit for deciding the on-hook state and off-hook state depending on an output voltage of the detector 14.

Operations of the structure of FIG. 2A are then explained hereunder.

The detecting circuit 15 detects a low frequency AC voltage generated across the ring trip detecting resistance (RS) 12. The filter/integrating circuit 16 removes an AC element and integrates the signal to output the integrated signal.

In the structure of the conventional converter 14, the filter/integrating circuit 16 cannot sufficiently remove the AC element and provides an output at the point A having the voltage waveform shown in FIG. 2B. In the filter/integrating circuit 16, since an AC element from the ringer generator 11 cannot be removed perfectly, the low frequency AC voltage not including the DC element is outputted under the on-hook state, while the low frequency AC voltage in which an AC element is superposed on the DC element is outputted under the off-hook state. The deciding circuit 17 discriminates the on-hook state and off-hook state by detecting the output voltages at the point A including different DC elements.

FIGS. 3A–3D are explanatory diagrams for explaining a problem to be solved by the present invention. FIG. 3A schematically illustrates that a plurality of telephone sets are connected to a short line length. FIG. 3B shows an output voltage at the point A in FIG. 3A. FIG. 3C schematically illustrates that only one telephone set is connected to a long line length. FIG. 3D shows an output voltage at the point A in FIG. 3C.

In FIG. 3A, the point A is an output point of the detector for detecting the on-hook and off-hook states of a subscriber terminal (a telephone set, in this case) when the subscriber circuit is called. Elements 30 to 32 are telephone sets; element 33 is a subscriber circuit. FIG. 3B shows an output voltage at the point A of FIG. 3A.

In FIG. 3B, 1 indicates the on-hook period and, 2 indicates the off-hook period. In the case of FIG. 3A, a difference of DC voltage elements under the on-hook and off-hook states and an AC element voltage AO under the on-hook state are both in high level.

In FIG. 3C, element 34 is a telephone set; element 35 is a subscriber circuit; elements 36 and 37 are resistance elements of lines. The point A is an output point of the detector for detecting the on-hook and off-hook states of the subscriber terminal, while the subscribed circuit 35 is called.

In FIG. 3D, 3 indicates the on-hook period and 4 indicates the off-hook state.

In the FIG. 3C, a difference of DC elements under the on-hook and off-hook states and an AC element voltage AO under the off-hook period are both in low level. A voltage amplitude AO of an AC element under the on-hook state is large in the case of FIG. 3A, and the voltage amplitudes AO of the DC element and the AC element under the off-hook state are small in the case of FIG. 3C.

In the prior art, it has been difficult to discriminate the on-hook state and off-hook state in FIG. 3D (discrimination between 1 and 4) by directly comparing the voltage values with the reference value.

SUMMARY OF THE INVENTION

It is therefore an object of the present invention to provide a ring trip deciding method which can reliably detect the on-hook and off-hook states without relation to the conditions in the load side. This method is intended to decide the on-hook and off-hook states by detecting transitional voltage change from the on-hook to the off-hook state.

FIG. 4 illustrates a basic structure of the present embodiment of the present invention. FIG. 4A shows a basic structure of the first invention.

In this figure, the element 1 is a ringer generator; element 2 is a ring trip detecting resistance; element 3 is a ring trip circuit; element 40 is a detector, which is similar to the prior art; element 41 is a voltage comparator for comparing the predetermined threshold value with an output voltage of the detector 40 to provide different outputs when an output voltage of the detector 40 is larger or smaller than the threshold value; element 42 is a state latch (1) for latching a state value which is determined depending on an output value of the voltage comparator 41 to indicate an output voltage of the detector 10 is larger or smaller than the threshold value; element 43 is a state latch (2) for fetching, latching and outputting a state of the state latch 1 synchronously with the clock; element 44 is a state latch (3) for fetching, latching and outputting a state of the state latch 2 synchronously with the clock; element 45 is a deciding unit for comparing an output (state 1) of the state latch 2 with an output (state 2) of the state latch 3 to decide the ring trip condition.

FIG. 4B shows a basic structure of the second embodiment of the present invention. In this figure, the elements that are the same as those in FIG. 4A are given the same reference numerals, and the same explanation is not repeated here. The element 46 is a timing unit that adjusts the timings of the SD signal for sending a ringer signal and the clock (RT) synchronized with the ringer period, and generates a synchronous signal for the operations of the successive stages; element 47 is a threshold storing unit for fetching, latching and outputting an output of the voltage comparator 41 synchronously with an operation synchronous signal generated by the timing unit 46; element 48 is a noise filter for removing noise in the output of deciding unit. The deciding unit 45 in the second invention compares an output of the state latch 2 with an output of the threshold value storing unit to decide the ring trip condition.

BRIEF DESCRIPTION OF THE DRAWINGS

FIGS. 8A to 8H shows an example of the truth value tables of a ring trip deciding circuit based on the second aspect of the first embodiment of the present invention;

DESCRIPTION OF THE PREFERRED EMBODIMENTS

Figure 5:
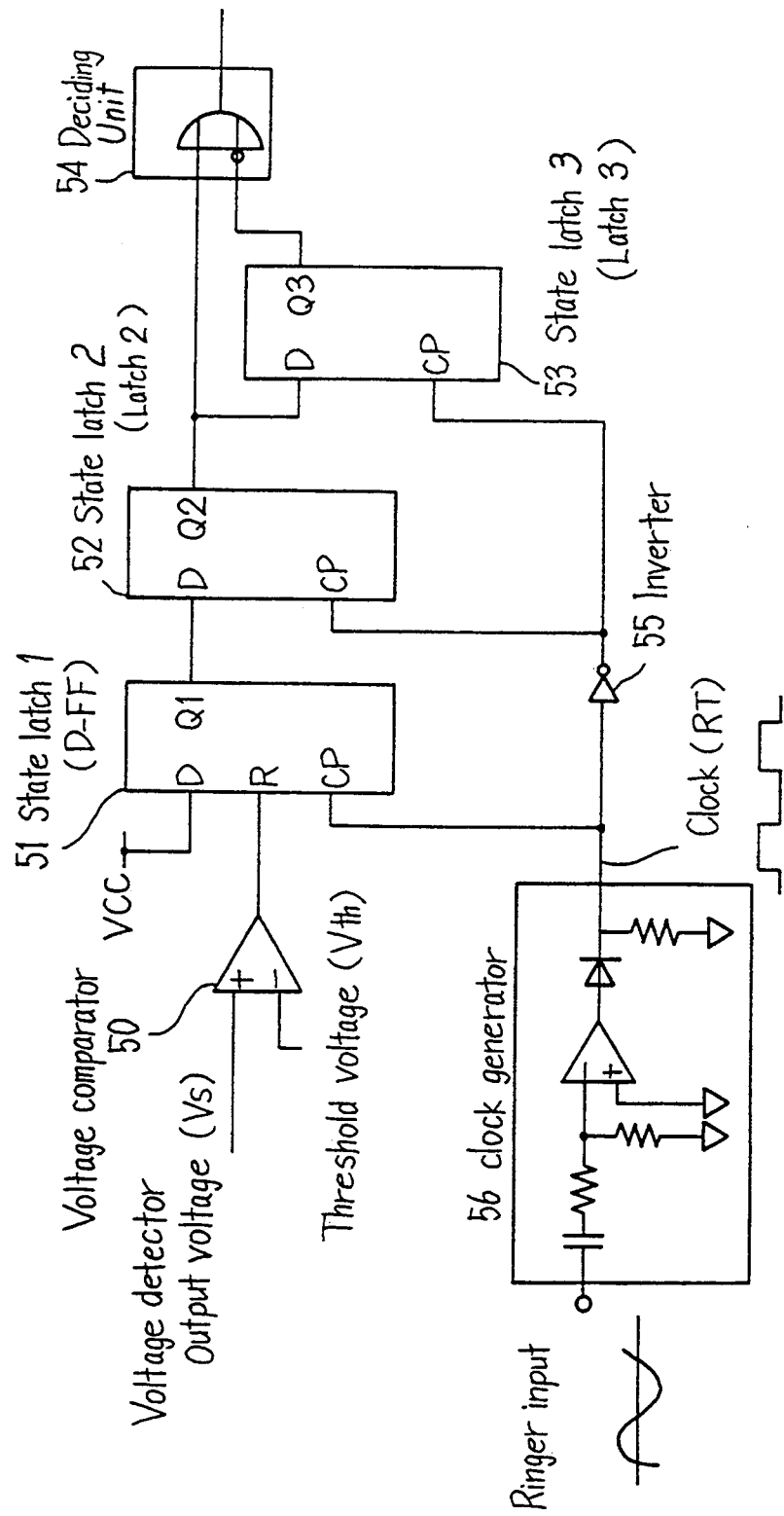
FIG. 5 shows a ring trip deciding circuit based on the first aspect of the first embodiment of the present invention.

FIG. 5 shows a ring trip deciding circuit based on the first aspect of the first embodiment of the present invention.

In this figure, the element 50 is a voltage comparator for comparing an output voltage ($V_s$) of the voltage detector with a threshold voltage ($V_{th}$) to output an output 1 when the output voltage of voltage detector is larger than the threshold value or an output 0 when the output voltage is equal to or smaller than the threshold value.

Element 51 is a state latch (1), formed by a D-flipflop (D-FF), which is reset nonsynchronously by an output value 1 of the voltage comparator 50 in order to provide an output Q1=0. Moreover, D-FF(51) outputs D-input as Q1 synchronously with the clock (RT) inputted to the clock input CP. The D-input value of D-FF(51) is fixed to the value 1 of $V_{cc}$.

Element 51 is a state latch (2) (Latch 2), formed by a latch, for outputting an output value Q1 of the state latch 51 to Q2 synchronously with the clock (NOT of RT) to be inputted to the clock input CP.

Element 53 is a state latch (3) (Latch 3) for fetching an output value Q2 of the state latch 52 and outputting it to Q2 synchronously with the clock (NOT of RT).

Element 54 is a deciding means for inputting an output value Q2 of the state latch (2) 52 and an output value Q3 of the state latch 53 for the purpose of comparison and deciding the logic thereof for deciding the ring trip condition.

Element 55 an inverter for inverting the clocks (RT) which are synchronous pulses of the state latch (2) 52 and the state latch (3) 53.

Element 56 is a clock generator for generating the clock (RT) from the ringer signal sent from the ringer generator 1.

Figure 6:
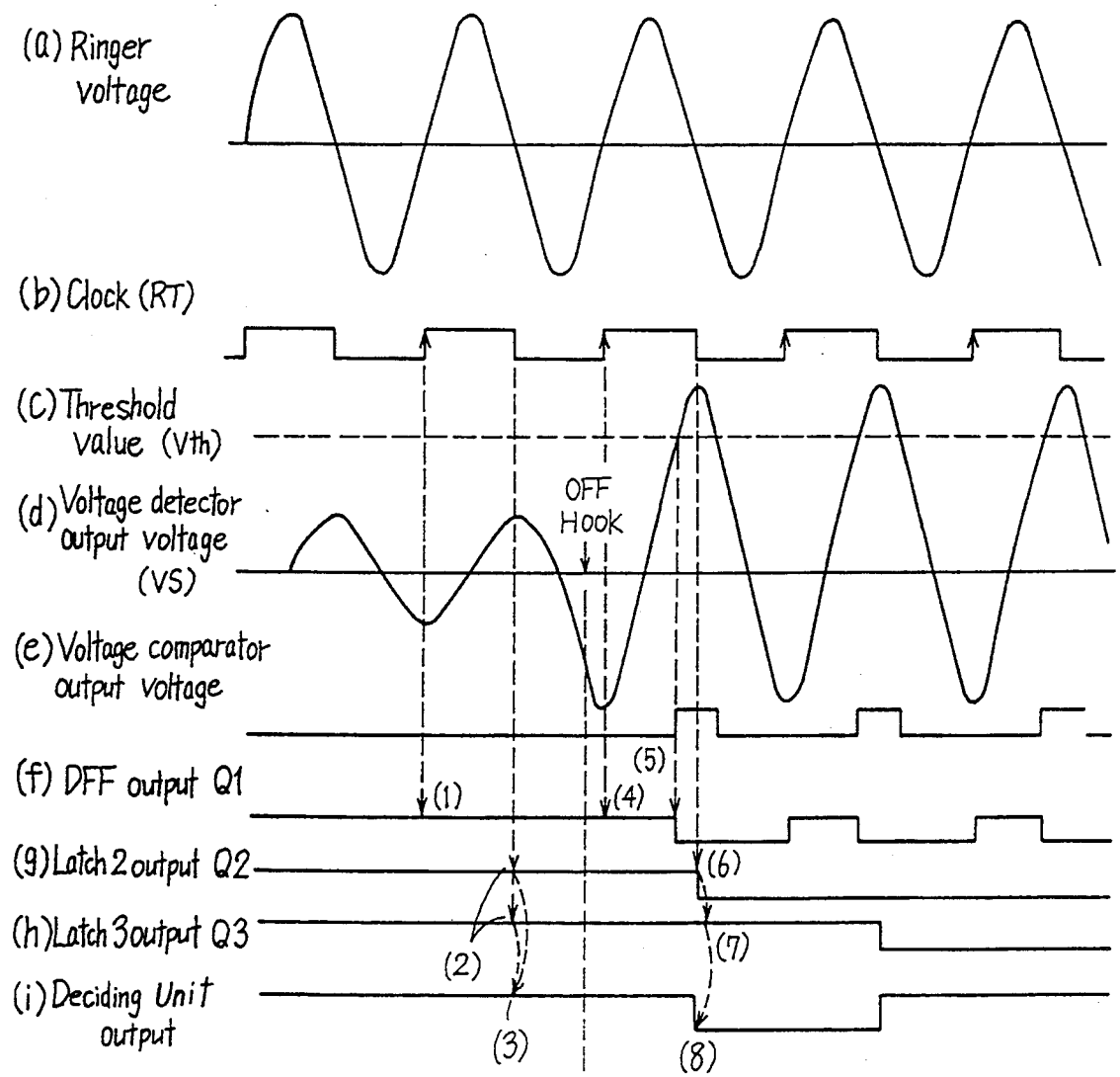
FIG. 6 is a timechart of the first aspect of the first embodiment of the present invention.

FIG. 6 shows a timechart based on the first aspect of the first embodiment of the present invention.

In this figure, waveform (a) is a ringer voltage which is outputted from the ringer generator 1. Waveform (b) is a clock (RT) generated by the clock generator 56 synchronously with the ringer voltage (a). Waveform (c) is a threshold voltage ($V_{th}$) of the voltage comparator 50. Waveform (d) is an output voltage ($V_s$) of the voltage detector indicating an output voltage of the on-hook voltage and off-hook voltage (after the OFF HOOK in the figure). Waveform (e) is an output voltage of the voltage comparator 50. Waveform (f) is an output Q1 of the state latch (1)(D-FF). Waveform (g) is an output Q2 of the state latch (2)(Latch 2). Waveform (h) is an output Q3 of the state latch (3) (Latch 3).

Operations of the first aspect of the first embodiment of the present invention sown in FIG. 5 will be explained with reference to FIG. 6.

The clock generator 56 generates a clock (RT) from the ringer voltage (a). D-FF 51, Latch (2) 52, Latch (3) 53 output respective D-input values to the outputs Q1, Q2, Q3 synchronously with the clock (RT).

D-FF 51 fetches a value 1 which is a fixed value $V_{cc}$ of the D-input synchronously with the rising edge of the clock (RT) and outputs it as the output Q1 ((1)). In the case of the waveforms a, b of the output voltage ($V_s$) of the voltage detector in the on-hook state (before the OFF HOOK in FIG. 3), these are lower than the threshold voltage $V_{th}$ (c) and therefore the output voltage (e) of the voltage comparator 50 remains as 0. In this case, the Latch 2 and Latch 3 respectively output a value 1 as the outputs Q2, Q3 synchronously with the clock (NOT of RT:falling edge) ((2)).

Therefore, under the on-hook state, the input values Q2, Q3 of the deciding unit 54 are equal to the value 1 and the ring trip is not carried out ((3)).

Next, in the case of waveforms b, c of the output voltage ($V_s$) of the voltage detector, waveform b is lower than the threshold voltage $V_{th}$ (c) and an output voltage (e) of the voltage comparator 50 becomes 0. Therefore, the Latch 2 fetches a value 1 (condition of waveform b) of the output Q1 from D-FF 51 synchronously with the clock (NOT of RT) and outputs it to the output Q2 ((2)).

The voltage comparator 50 outputs, when the waveform c of the output voltage ($V_s$) of the voltage detector coming next has exceeded the threshold voltage $V_{th}$(c), an output voltage (e) as the value 1 only during the period of exceeding the threshold voltage $V_{th}$ (c). Meanwhile, D-FF 51 continuously outputs a value 1 as the output Q1 synchronously with the clock (RT) ((4)) and is then reset by the output voltage (e) to invert the value 1 of the output Q1 to the value 0 ((5)).

The Latch 2 fetches a value 0 of the output Q1 from D-FF 51 under the condition of the waveform c synchronously with the next clock(NOT of RT) and outputs it as the output Q2 ((6)). In the same timing, the Latch 3 fetches a value 1 (under the condition of the waveform b) of the preceding output value Q2 from the Latch 2 and outputs it to the output Q3 ((7)).

Thereby, the deciding unit 54 inputs a value 0 of the output Q2 of the Latch 2 (condition of the waveform c) and a value 1 of the output Q3 of the Latch 3 (condition of the waveform b) and outputs a value 0 through the logical decision to detect the off-hook state. ((8)).

Therefore, according to a structure of the first aspect of the first embodiment of the present invention, since the on-hook state and the off-hook state are detected after conversion of the state value to different values, even when an output voltage ($V_s$) of the voltage detector is small, the on-hook and off-state states can be discriminated reliably.

On the other hand, in the case of the waveforms c, d, e, . . . of the output voltage ($V_s$) of the voltage detector, since all waveforms exceed the threshold voltage $V_{th}$ (c), outputs Q2, Q3 of the Latch 2 and Latch 3 are both zero and the same state is latched, an output of the deciding unit restores to the value 1 ((9)).

Figure 7:
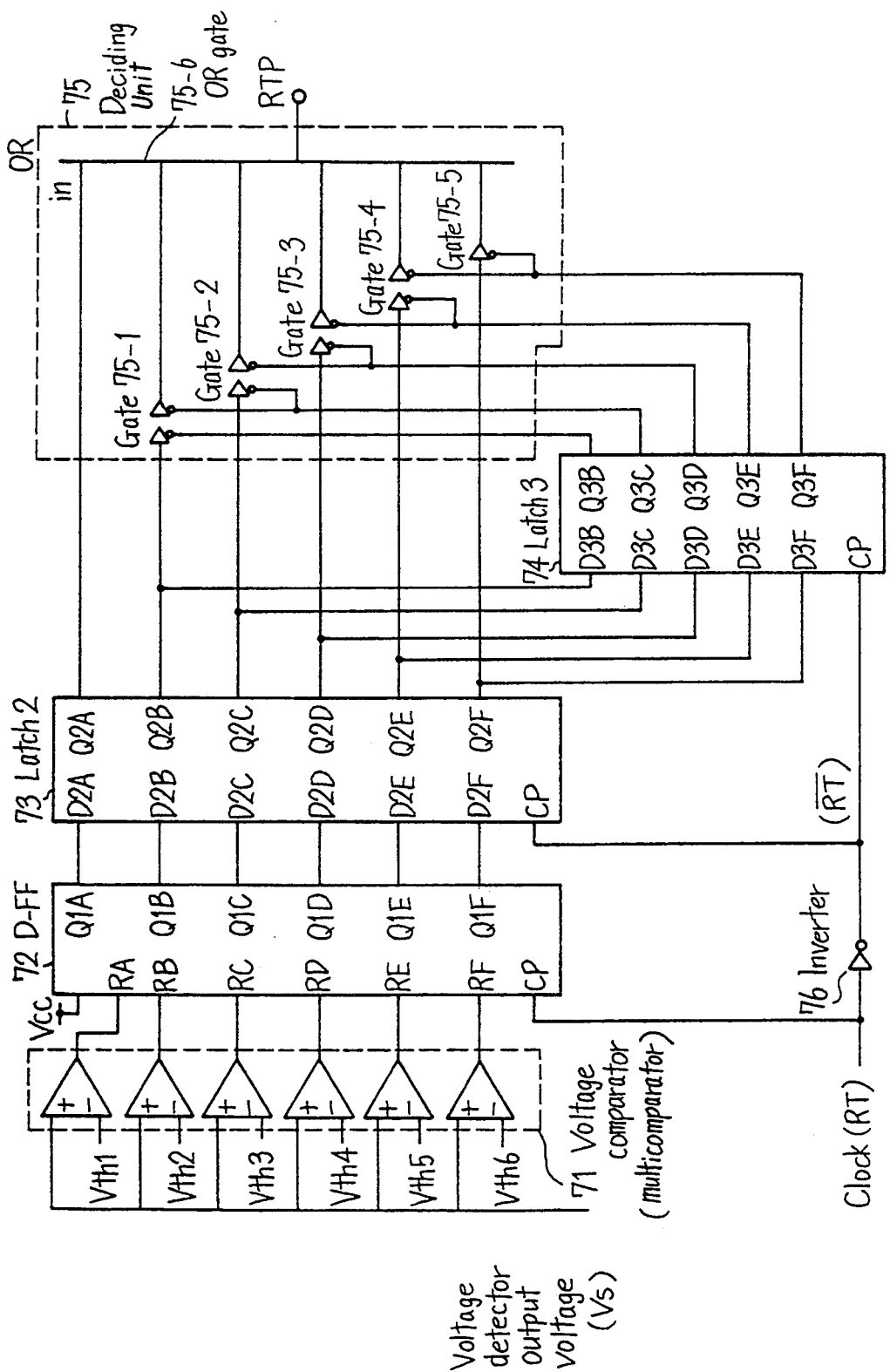
FIG. 7 shows a ring trip deciding circuit based on the second aspect of the first embodiment of the present invention.

FIG. 7 shows a ring trip deciding circuit based on the second aspect of the first embodiment of the present invention. In this second aspect, a plurality of threshold values are provided and when an output voltage having exceeded the predetermined number of threshold value voltages, the off-hook state can be detected.

In this figure, the element 71 is a voltage comparator (multicomparator) which is formed by a plurality of comparators having any one threshold value voltage among $V_{th}1$ to $V_{th}6$ in order to respectively compare the threshold values $V_{th}1$ to $V_{th}6$ with an output voltage $V_s$ of the voltage detector and outputs different output values for each threshold value when an output voltage $V_s$ of the voltage detector is larger or smaller than the threshold value.

Element 72 is a 6-bit D-flipflop (D-FF) which is inputted at the reset input terminals RA to RF with comparison results of the threshold values $V_{th}1$ to $V_{th}6$ of the multicomparator 71 and respectively resets corresponding outputs Q1A to Q1F. The D-input of D-FF 72 is fixed to the value 1 as $V_{cc}$.

Element 73 is a Latch 2, formed by a 6-bit latch means, to be inputted by the outputs Q1A to Q1F of D-FF 72 at the inputs D2A to D2F in order to output these inputs to respective outputs Q2A to Q2F synchronously with the clock (NOT of RT).

Element 74 is a Latch (3), formed by a 5-bit latch, for fetching respectively the outputs Q2B to Q2F of the Latch (2) 73 to the inputs D3B to D3F synchronously with the clock (NOT of RT) in order to output these inputs to the output Q3B to Q3F.

Element 75 is a deciding unit formed by the gates 75-1 to 75-5 and the OR gate 75-6. The gates 75-1 to 75-5 invalidates (sets the value to 0) a value of the outputs Q2B to Q2F of the corresponding Latch (2) 73, when the outputs Q3B to Q3F of the Latch (3) 74 are value 1. The second embodiment shown in FIG. 7 provides a structure that each output of Q3C to Q3F of the Latch 3 invalidates the gates of the corresponding outputs Q2C to Q2F of the Latch (2) and the gates of the corresponding outputs Q2B to Q2E so that the off-hook state is detected when the threshold value of the continuous waveform of the output voltage $V_s$ of the voltage detector is different by 2 or more. The OR gate 75-6 outputs the OR logic (RTP) of each input (in).

Element 76 is an inverter for inhibiting the logic of the clock (RT).

Figure 1:
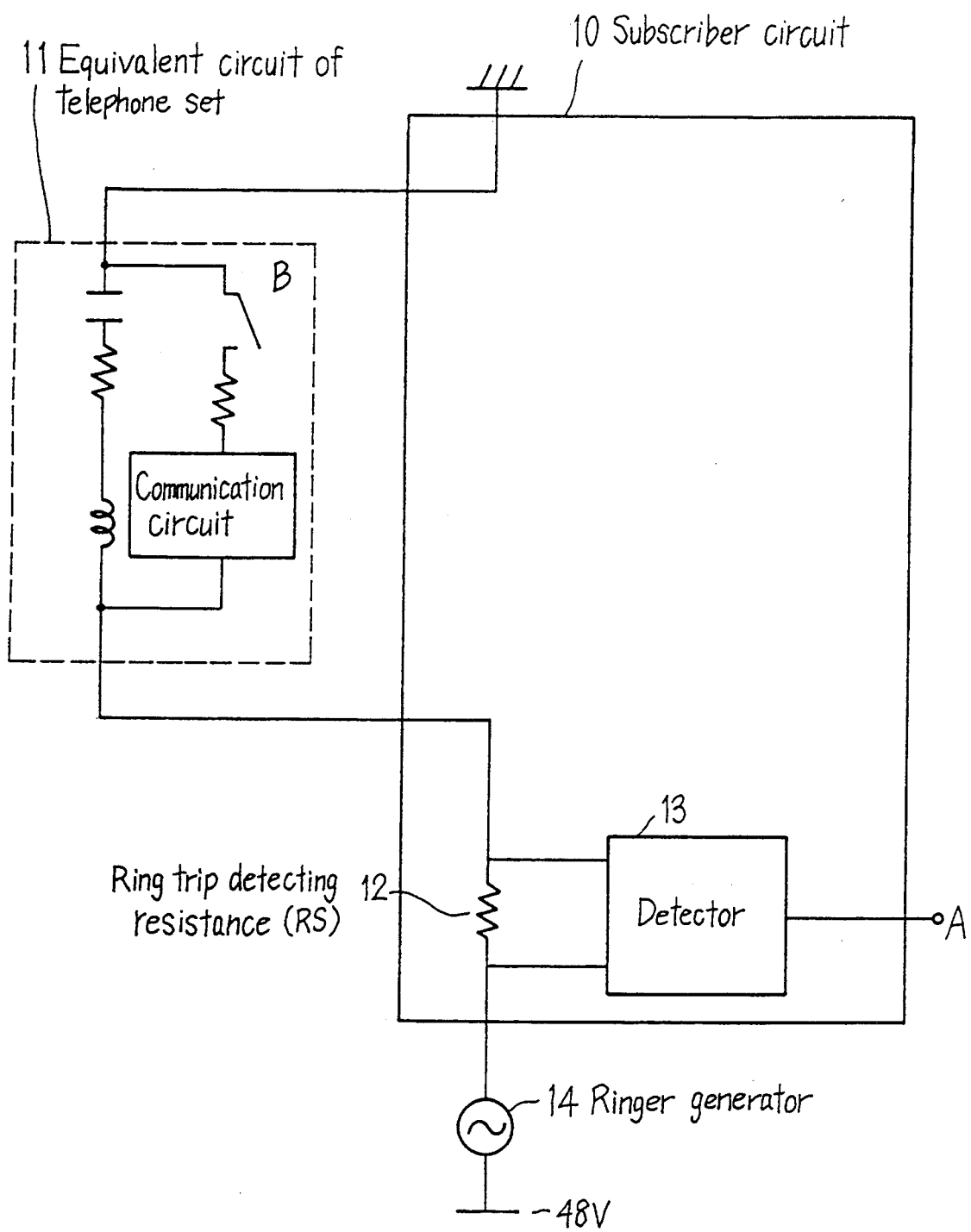
FIG. 1 is an explanatory diagram showing the ring trip deciding method.
Figure 2A:
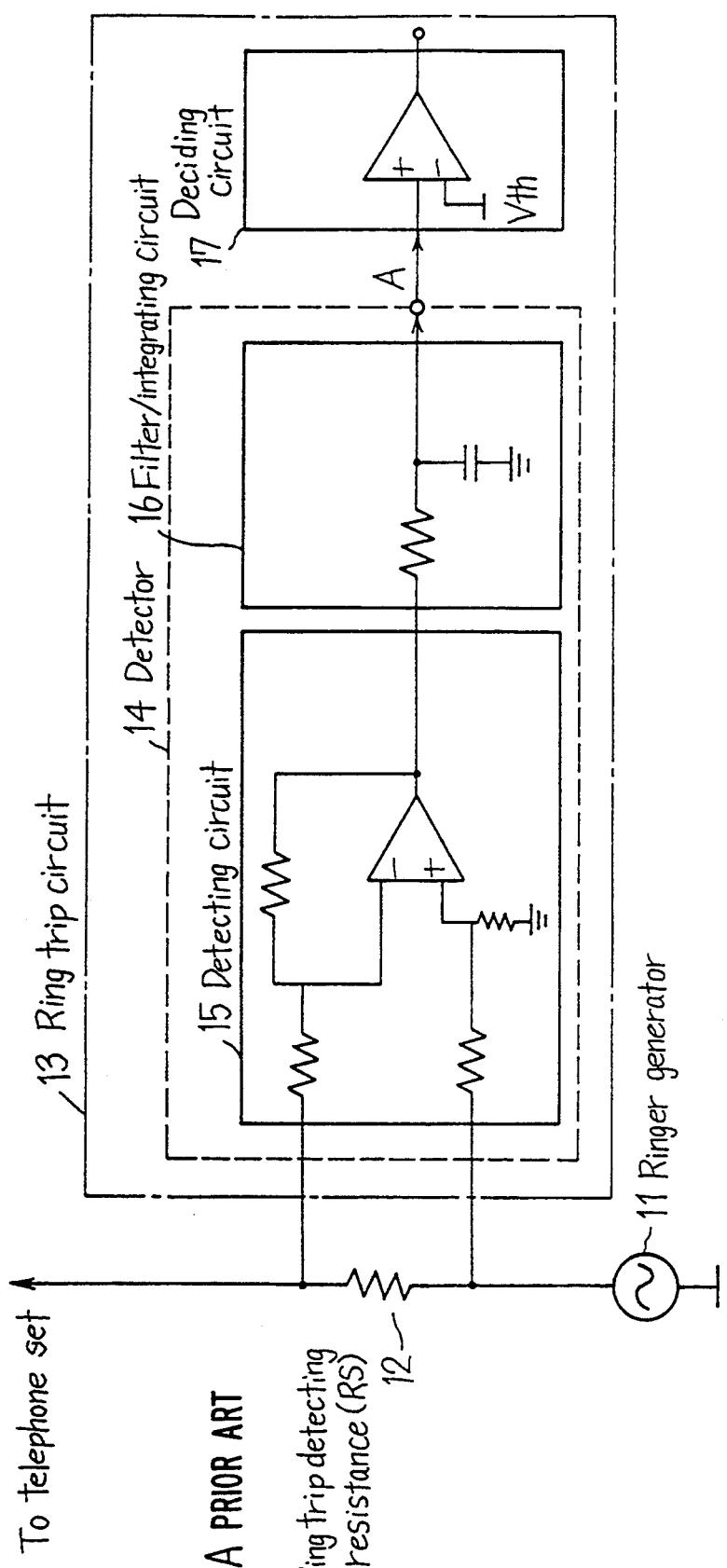
FIG. 2A shows a conventional ring trip deciding circuit.
Figure 2B:
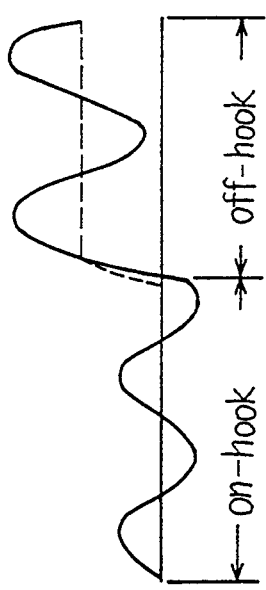
FIG. 2B shows an output voltage waveform at the point A of the detector 14.
Figure 3A:
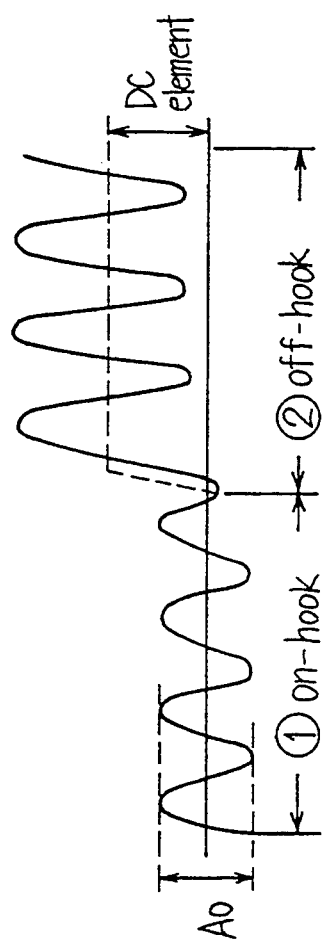
FIG. 3A is a schematic diagram illustrating a structure that a plurality of telephone sets are connected to a short telephone line.
Figure 3B:
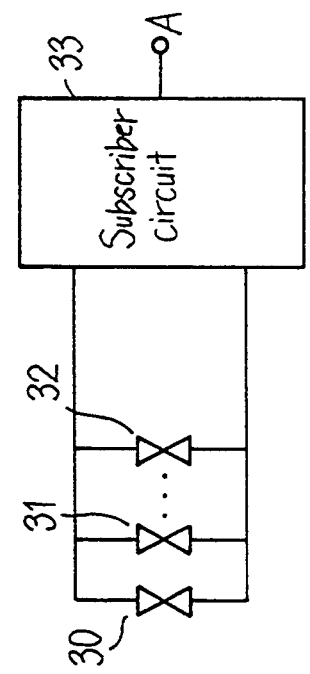
FIG. 3B shows an output voltage at the point A of FIG. 3A.
Figure 3C:
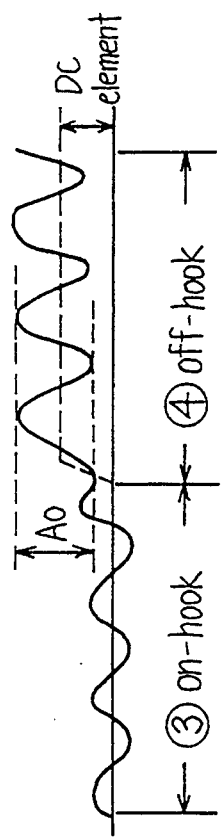
FIG. 3C is a schematic diagram illustrating a structure that only one telephone set is connected to a long telephone line.
Figure 3D:
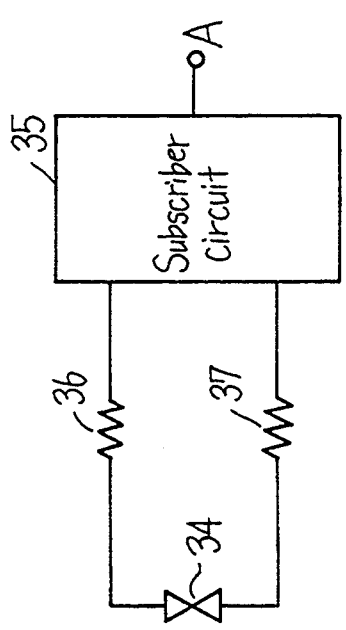
FIG. 3D shows an output voltage at the point A of FIG. 3C.
Figure 4A:
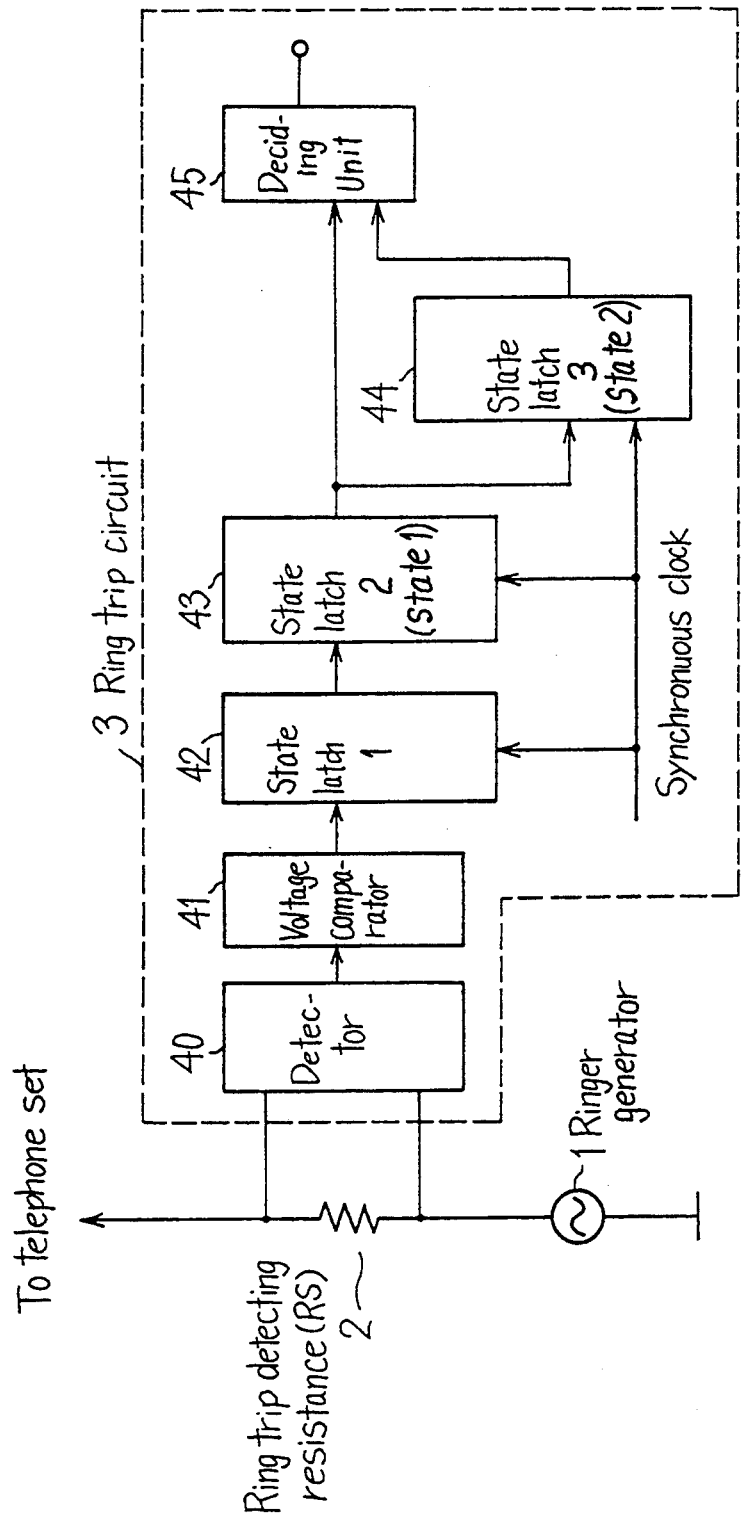
FIG. 4A shows a basic structure of the first embodiment of the present invention.
Figure 4B:
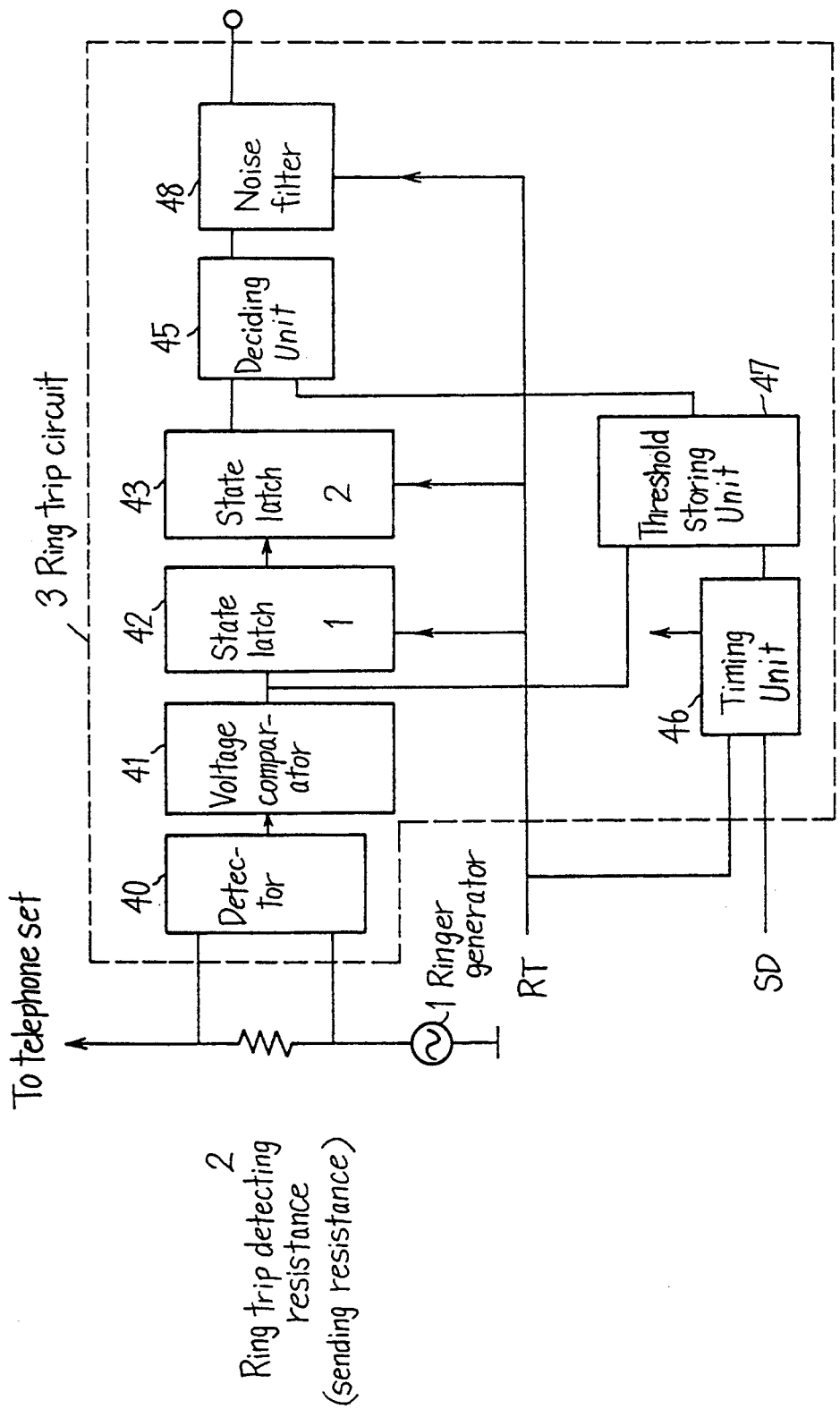
FIG. 4B shows a basic structure of the second embodiment of the present invention.

The threshold values $V_{th}1$, $V_{th}2$, $V_{th}3$, $V_{th}4$, $V_{th}5$, $V_{th}6$ of the multicomparator 71 of FIG. 1 are in the following relations of $V_{th}1 > V_{th}2 > V_{th}3 > V_{th}4 > V_{th}5 > V_{th}6$.

In the structure of FIG. 7, operations of the D-FF 72, Latch (2) 73, Latch (3) 74 to be carried out depending on each output of the multicomparator 71 are similar to that in FIG. 5 and FIG. 6. Moreover, second aspect of the first embodiment of the present invention of FIG. 7 is different in such a point that the corresponding bits are invalidated (set to the value 0), when outputs of the outputs Q2B to Q2F of the Latch (2) 73 are equal to the value 1 of the outputs Q3B to Q3F of the Latch (3) 74 and a value obtained by logical OR of the output of the output Q2A of the OR gate 75-6 and outputs of the gates 75-1 to 75-5 is outputted.

FIGS. 8A to 8H show examples of the tenth value table of the ring trip deciding circuit of the second aspect of the first embodiment of the present invention. In FIGS. 8A to 8H, $Q_xA$ to $Q_xF$ respectively indicate Q2A to Q2F and Q3A to Q3F. L2 is an output of the Latch (2), L3 is an output of the Latch (3), $OR_{in}$ is an input of the OR output 75-6 and RTP is an output of the OR output 75-6.

Moreover, the truth value table of FIG. 8A corresponds to the case where an output voltage ($V_s$) of the voltage detector is larger than $V_{th}1$, while the truth value table of FIG. 8B corresponds to the case where $V_s$ is smaller than $V_{th}6$ and the truth value tables of FIGS. 8C to 8H correspond to the case where $V_s$ is between $V_{th}1$ and $V_{th}5$.

As shown in the truth value table of FIG. 8A, in the second aspect of the first embodiment of the present invention, when $V_s$ is larger than $V_{th}1$, RTP is set to 1 and a subscriber is assumed as in the off-hook state. Moreover, when $V_s$ is smaller than $V_{th}6$, as the truth value table of FIG. 8B shows, a subscriber is assumed as in the on-hook state. When $V_s$ is between $V_{th}1$ and $V_{th}5$, decision is made depending on difference of the outputs of the Latch (2) and the Latch (3) ($V_s$ at the time t1 latched by the Latch (3) is compared with $V_s$ at the time t2 after the time t1 latched by the Latch (2)). When the output of the Latch (2) is larger than the output of the Latch (3) by 2-bit or more (when $V_s$ changes largely from the time t1 to the time t2), a subscriber is assumed to be in the off-hook state (the truth value tables of FIGS. 8D, 8F). In addition, when an output of the Latch (2) is smaller than, or equal to or larger than the output of the Latch 3 by only 1-bit (when $V_s$ at the time t1 is smaller than that at the time t2, or $V_s$ does not change from the time t1 to the time t2 or $V_s$ changes a little during such period), a subscriber is assumed to be remaining in the on-hook state (FIGS. 8F, 8G, 8H).

According to the second aspect of the first embodiment of the first invention, even if it is difficult to decide whether an output voltage ($V_s$) of the voltage detector corresponds to the on-hook or off-hook state, the on-hook and off-hook state can be decided accurately by providing a plurality of threshold values $V_{th}1$ to $V_{th}6$ to detect a degree of the voltage change.

Figure 9:
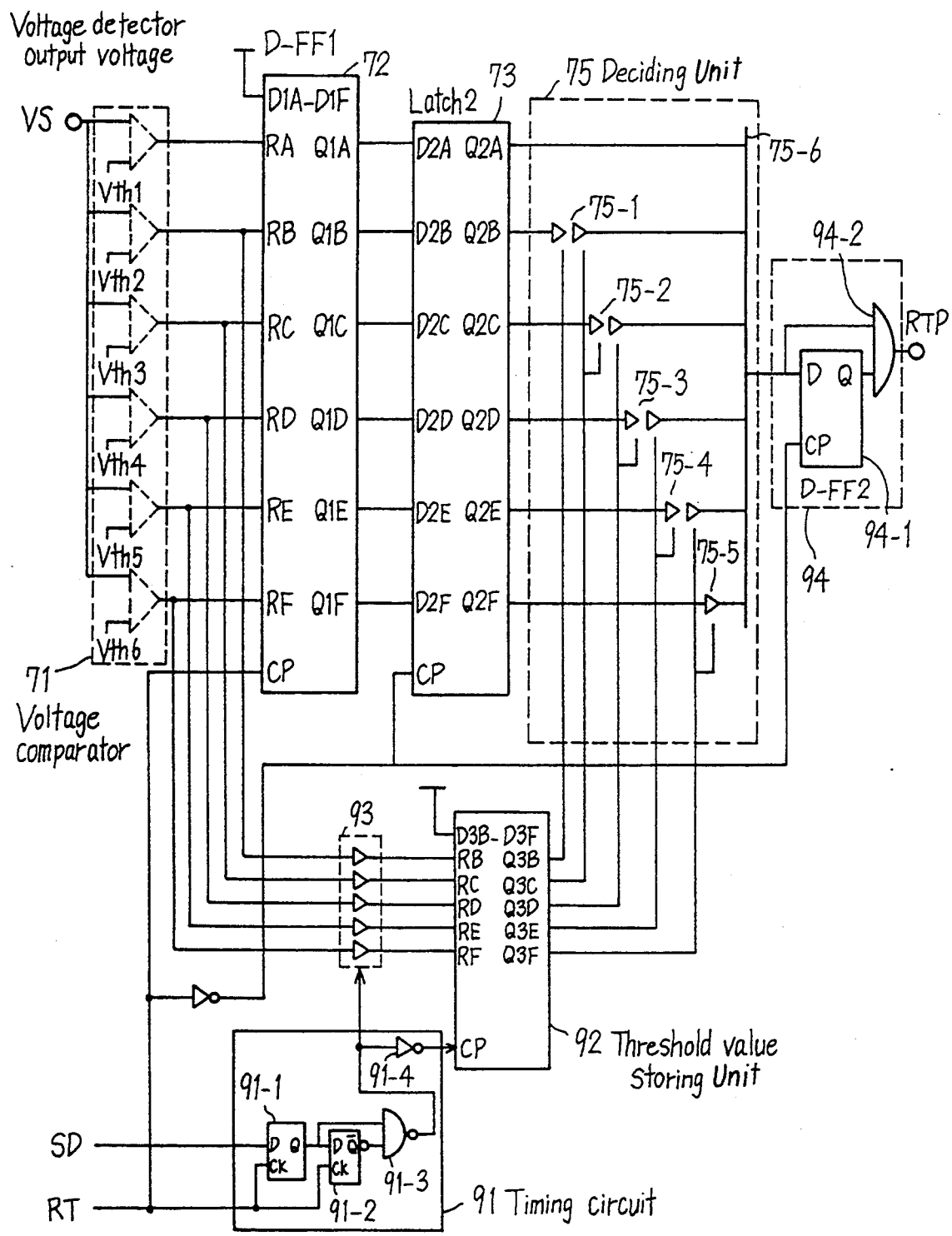
FIG. 9 shows a ring trip deciding circuit based on the second embodiment of the present invention.

FIG. 9 shows a ring trip deciding circuit as a second embodiment of the present invention. In this figure, the elements like those in FIG. 7 are given the like reference numerals.

In this figure, the element 9 is a timing circuit composed of D-FF 91-1, element 91-2 is a NAND gate 91-3 and a NOT gate 91-4. D-FF 91-1 fetches and output the SD signal for designating the transmission of ringer signal sent from the exchange side synchronously with the clock (RT) synchronized with the ringer period and D-FF 91-2 also fetches such output synchronously with the clock (RT) and outputs an inverted input. Outputs of both D-FF 91-1 and D-FF 91-2 are applied to the NOT gate 91-3 and thereafter the inverted signal is outputted. As a result, the signal obtained by differentiating the SD signal for the one period appears.

Element 92 is a threshold value storing means which is composed of registers to fetch, latch and output an output of the voltage comparator 71 synchronously with the operation synchronous signal generated by the timing generation signal 91.

Element 93 is a gate for inputting outputs of the comparator corresponding to the reference voltages $V_{th}2$ to $V_{th}6$ of the voltage comparator 71 to the resets RB to RF of the threshold value storing means 92 via the gate 93 under the control of the timing circuit 91 (synchronously with an output of the NOT gate 91-3).

Element 94 is a noise filter which is formed by the D-FF 94-1 to which an output of the OR gate 75-6 of the deciding unit 75 is inputted at the D-input and the AND gate 94-2 for taking logical OR of the output Q of D-FF 94-1 and the OR gate 75-6 to remove noise in the output from the deciding means 75.

Figure 10:
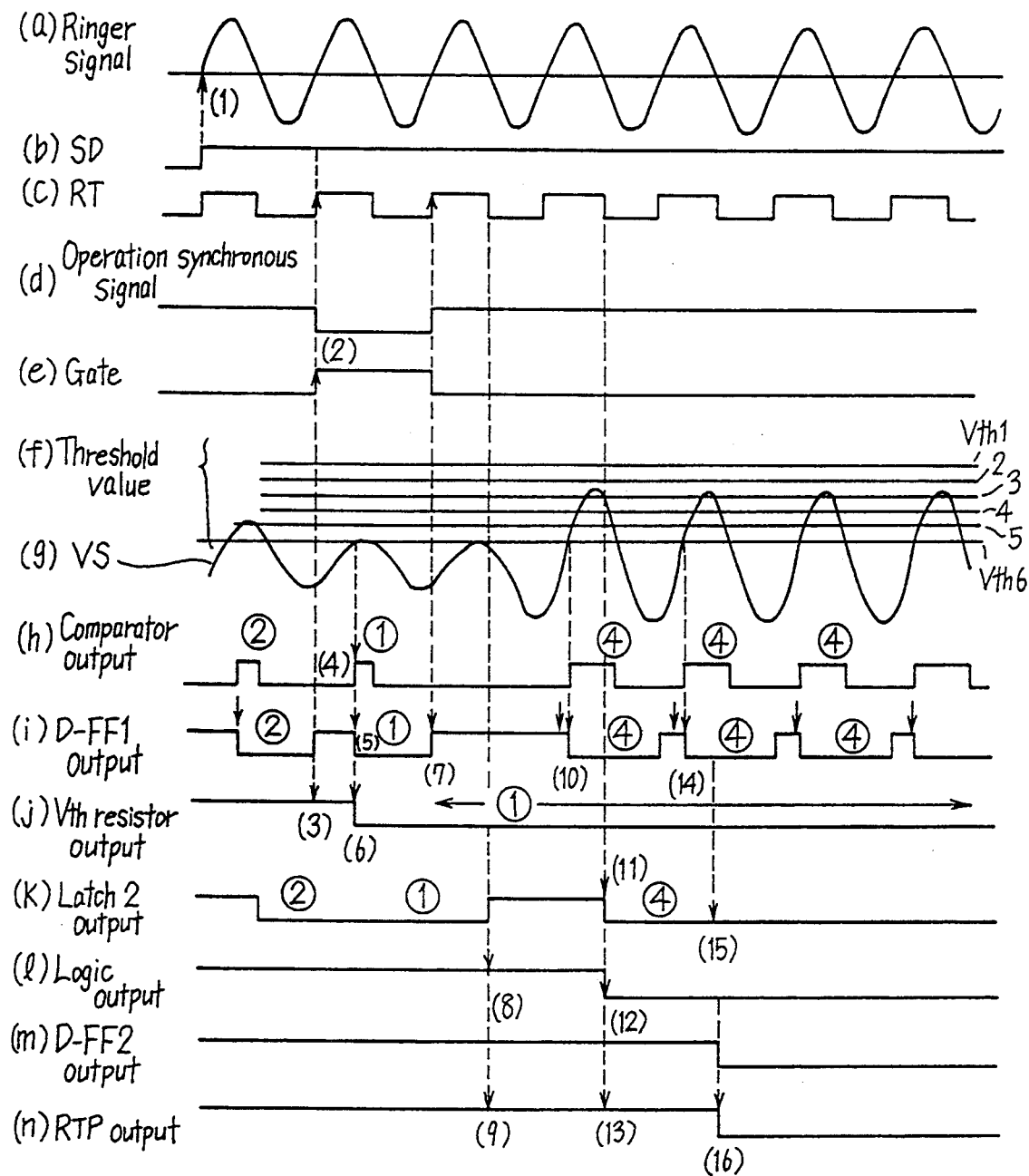
FIG. 10 is a timechart of the second embodiment of the present invention.

FIG. 10 shows a timechart of the second embodiment of the present invention.

In this figure, waveform (a) is a ringer voltage which is generated from the ringer generator. Waveform (b) is an SD signal for sending a ringer signal transmitted from the exchange side. Waveform (c) is a clock (RT) generated synchronously with the ringer voltage (a). Waveform (d) is an operation synchronous signal obtained by differentiating the one period (for example, 50 ms) of the SD signal generated by the timing circuit 91. Waveform (e) is an operation synchronous signal of the gate 93 for opening the gate only for the period of the value 1. Waveform (f) is a plurality of threshold voltages $V_{th}1$ to $V_{th}6$ of the voltage comparator 71. Waveform (g) is an output voltage ($V_s$) of the voltage detector, indicating an on-hook and off-hook output voltage (after OFF HOOK in the figure). Waveform (h) is an output for each threshold voltage of the voltage comparator 71 (multicomparator). The numeral given in the circle corresponds to the output of voltage comparator exceeding the threshold values. That is, ①  is the output voltage $V_s$ of the voltage detector exceeding only the threshold value $V_{th}6$. ②  is the voltage $V_s$ exceeding the threshold values $V_{th}5$, $V_{th}6$. ③  is the voltage $V_s$ exceeding the threshold values $V_{th}4$, $V_{th}5$, $V_{th}6$, Waveform (i) indicates a plurality of outputs Q1A to Q1F of D-FF 72. ① indicates only the reset output Q1F; ② indicate the reset outputs Q1E and Q1F and ③ indicates the reset outputs Q1D to Q1F, ... (j) indicates the outputs Q3B to Q3F of the threshold value storing means 92. In this case, ① indicates only the reset output Q3F; ② indicates the reset outputs Q3E and Q3F and ③ indicates the reset outputs Q3D to Q3F. Waveform (k) indicates the outputs Q2A to Q2F of the Latch (2). ① indicates only the reset output Q2F; ② indicates the reset outputs of Q2E and Q2F; ③ indicates the reset outputs of Q2D to Q2F. Waveform (l) indicates the output of deciding means 75. Waveforms (m) and (n) are outputs of D-FF2 (94-1) of a noise filter 94 and AND gate 94-2.

Operations of an embodiment of the second invention shown in FIG. 9 are explained with reference to FIG. 10.

A ringer voltage (a) is generated ((1)) by the SD signal (b) from the exchange and the clock RT(c) is generated from this ringer signal (a). In the second embodiment of the present invention, when a subscriber is called, the timing circuit 91 generates ((2)) an operation synchronous signal (d) of the timing of differentiating the ringer signal (a) for the one period. The threshold storing unit 92 fetches a fixed value of $V_{cc}$ of D-input synchronously with the operation synchronous signal (d) and sets all outputs Q3B to Q3F to the value 1 ((3)). Simultaneously, the gate 93 enters the open state for a constant period. While the gate 93 is in the open state, the comparator having the threshold value $V_{th}6$ of the voltage comparator 71 provides ((4)) an output (h) of the value 1 only for the period where the output voltage $V_s$ has exceeded the threshold value voltage $V_{th}6$, since the waveform b of the second output voltage $V_s$ of the voltage detector exceeds the threshold voltage $V_{th}6$. Thereby, in the threshold value storing unit 92 storing the outputs Q3B to Q3F of the value 1, only the output Q3F is reset to become 0 ((6)) and the threshold value storing means 92 stores the waveform b as the threshold value for deciding the off-hook state. Simultaneously, D-FF 72 resets the output Q1F to the value 0 ((5)). Subsequently, the deciding unit 75 compares the threshold value (waveform b) from the threshold value storing unit 92 with the waveforms c, d, e, . . . of the output voltage $V_s$ of the voltage detector.

Here, the reason for fetching the second waveform b as the reference threshold value without fetching the first waveform a as the reference threshold value for deciding the off-hook state is that the ring trip may be sometimes generated because a rush current flows due to the influence of the capacitance of the telephone set in the moment that the subscriber is actually called, such rush current appears as an output of the voltage detector 40 and thereby only the first waveform a becomes the large signal for causing the ring trip. In this embodiment of the present invention, the operation synchronous signal is obtained by differentiating the SD signal for only the one period (50 ms), but the period is not limited thereto and can be set freely to the desired periods.

D-FF1 72 fetches a fixed value $V_{cc}$ synchronously with the next clock RT and changes the output Q1F to the value 1 from 0 ((7)). In the case of the third waveform c, it does not exceed the threshold values $V_{th}1$ to $V_{th}6$. Accordingly, all outputs of the voltage comparator 41 become zero and all outputs Q1A to Q1F of D-FF1 72 and all outputs Q2A to Q2F of the Latch (2) are held to the value 1. Since the deciding unit 75 invalidates the gates 75-4 and 75-5 with the output Q3F having the value 1 sent from the threshold value storing unit 92, an output of the OR gate 75-6 becomes the value 1 ((8)). Therefore, the output RTP of the AND gate 94-2 has a value 1 and the off-hook state is not decided ((9)).

Since the 4th waveform d of the output voltage $V_s$ of the voltage comparator exceeds the threshold values $V_{th}3$ to $V_{th}6$, outputs of the comparators having the threshold values $V_{th}3$ to $V_{th}6$ of the voltage comparator 71 become the value 1 and the outputs Q1C to Q1F of D-FF1 72 and the outputs Q2C to Q2F of the Lath (2) 73 change to the value 1 to 0 ((10), (11)). Since the deciding unit 75 invalidates the gates 75-4 and 75-5, the value 0 of the outputs Q2E and Q2F of the Latch (2) 73 is not inputted to the OR gate 75-6, but the value 0 of the output Q2D of the Latch (2) 73 enters the OR gate 75-6 and thereby an output of the deciding unit 75 becomes 0 ((12)). D-FF2 94-1 holds the preceding output value 1 until the next clock falls and the AND gate 94-2 does not make ring trip ((13)).

Next, the waveform e of the 5th output voltage $V_s$ also resets the outputs Q1D to Q1F of D-FF1 72 as in the case of the waveform d of the output voltage $V_s$ and changes the outputs Q2D to Q2F of the Latch (2) 73 synchronously with the next clock (NOT of RT) ((14), (15)). Therefore, at the falling edge of the clock (RT), the AND gate 94-2 is validated by the value 0 of the output value Q of D-FF2 94-1 and the output value 0 of the deciding unit 75 and its output RTP changes to the value 0, making the ring trip ((16)).

That is, this noise filter 94 reads twice an output of the deciding unit 75. When the data continues for two periods or longer of the clock, the data is considered valid and is then outputted to the subsequent stage as the ring trip signal RTP. Moreover, in the second embodiment of the present invention, since a voltage value of the threshold value is compared with the input voltage value, RTP is always held to the value 0 in the off-hook state (waveforms f, g).

According to the present invention, since on-hook and off-hook state are decided depending on transition of state of the ring trip detecting voltage, the ring trip state can be decided accurately without relation to the load condition such as the line length up to the subscriber terminal and the number of terminals. Moreover, even when the output of ring trip detecting circuit changes gradually, the threshold values in the on-hook/off-hook state are compared, the ring trip operation can be realized reliably and moreover since the output is read twice, trip error can be eliminated.

The present invention is effective for detection of the off-hook state when a terminal of the telephone set connected to the telephone line is called.

We claim:

1. A ring trip deciding circuit which detects an off-hook state of a subscriber terminal unit, having an on-hook state and the off-hook state, when the subscriber terminal unit connected to the telephone line is called, said ring trip deciding circuit comprising:

a ring generator outputting a ring signal;

a ring trip detecting resistance, connected in series with said ring generator, detecting change of current value depending on the on-hook state and the off-hook state; and a ring trip circuit connected in parallel to said ring trip detecting resistance and comprising:

a detector detecting change of voltage across said ring trip detecting resistance;

a voltage comparator connected to said detector and successively comparing a voltage outputted from said detector with a threshold value and outputting different values when the voltage is larger than the threshold value, first state latch means, coupled to said voltage comparator, for latching and outputting successive state values;

second state latch composite means, connected to the first state latch means, for successively fetching, latching and outputting at a common time two of the successive state values output by the first state latch means; and state deciding means for comparing the two successive state values with each other, wherein said state deciding means determines voltage change at respective, different times detected by said ring trip detecting resistance by comparing the two state values with each other to detect the on-hook state and the off-hook state of the subscriber terminal unit.

2. A ring trip deciding circuit according to claim 1, wherein the ring trip circuit further comprises a clock connected to the first state latch means and to the second state latch composite means and outputting a clock signal, and the second state latch composite means further comprises:

second state latch means, coupled to the first state latch means, for successively fetching, latching and outputting the successive state values output by the first state latching means synchronously with the clock signal; and third state latch means for fetching and latching the successive state values output by said second state latch means synchronously with the clock signal, wherein said deciding means determines voltage changes detected by the ring trip detecting resistance at different times by comparing the state values of the second state latch means and the third state latch means to detect the on-hook state and off-hook state of the subscriber terminal unit.

3. A ring trip deciding circuit according to claim 2, wherein the voltage comparator is composed of a multicomparator having a plurality of different threshold values, the first state latch means latches a state value determined by a plurality of output values of the multicomparator, the second state latch means fetches and latches a plurality of state values of the first state latch means, the third state latch means fetches and latches a plurality of state values outputted from the second state latch means and the deciding means decides voltage change in different times detected by the ring trip detecting resistance by comparing the state values of the state latch composite means and the third state latch means with each other to detect the on-hook state and the off-hook state of the subscriber terminal unit.

4. A ring trip deciding circuit according to claim 3, wherein the deciding means invalidates an output value of the second state latch means determined by a corresponding threshold value in the case that an output value of the third state latch means latches a state value corresponding to the case that an output voltage of the detector has exceeded the threshold value, and said deciding means detects a large voltage change appearing across both ends of the ring trip detecting resistance by comparing the values of the second state latch means and the third state latch means to decide the on-hook state and the off-hook state.

5. A ring trip deciding circuit according to claim 3, wherein the deciding means decides, when an output voltage of the detector has exceeded the maximum threshold value of the multicomparator, the off-hook state not depending on an output value of the third state latch means.

6. A ring trip deciding circuit which detects an on-hook state and an off-hook state of a subscriber terminal unit when a subscriber terminal unit connected to a telephone line is called according to a predetermined timing, said ring trip deciding circuit comprising:

a ring generator outputting a ring signal;

a ring trip detecting resistance, which is connected in series with the ring generator, detecting change of current value depending on the on-hook state and the off-hook state;

a ring trip circuit connected in parallel to said ring trip detecting resistance and comprising:

a detector detecting change of voltage across said ring trip detecting resistance;

a voltage comparator connected to said detector and successive comparing a voltage outputted from said detector with a threshold value and outputting different values when the voltage is larger or smaller than the threshold value;

state latch composite means, coupled to said voltage comparator, for latching different state values depending on different output values of said voltage comparator and outputting the different state values synchronously with a clock;

threshold value storing means, coupled to the state latch composite means and to the voltage comparator, for fetching and latching a state value, based on the different values output by said voltage comparator, as the reference state value used in the predetermined timing, and outputting the reference state value synchronously with said clock; and state deciding means, coupled to the state latch composite means and to the threshold value storing means, for comparing the different state values of said state latch composite means and said reference state value, wherein, said state deciding means determines voltage change at respective different times detected by the ring trip detecting resistance by comparing the different state values of the state latch composite means with the reference state value of said threshold value storing means to detect the on-hook state and the off-hook state of the subscriber terminal unit.

7. A ring deciding circuit according to claim 6, wherein said ring trip circuit further comprises timing means for generating the clock and timing delayed by a specified period from a ringer signal generation starting time, and wherein said threshold value storing means fetches and latches, Synchronously with the clock, the state value of an output of said voltage comparator as the reference state value to output the reference state value synchronously with said clock.

8. A ring trip deciding circuit according to claim 7, wherein the voltage comparator comprises a multicomparator having a plurality of different threshold values, the state latch composite means latches state values determined by a plurality of output values of the multicomparator, the threshold value storing means fetches and latches a plurality of state values of the voltage comparator as reference state values and the state deciding means determines a voltage change detected by the ring trip detecting resistance by comparing the state values of the state latch composite means with the reference state values of the threshold value storing means to detect the on-hook state and the off-hook state of the subscriber terminal unit.

9. A ring trip deciding circuit according to claim 8, wherein the state latch composite means comprises:
a first state latch means, and
a second state latch means coupled to the first state latch means; and the deciding means invalidates an output value of the first state latch means determined by a corresponding threshold value when an output value of the second state latch means latches a state value corresponding to an output voltage of the detector exceeding the threshold value, and said state deciding means detects a large voltage change appearing across both ends of the ring trip detecting resistance by comparing the values of the first state latch means and the second state latch means to determine the on-hook state and the off-hook state.

10. A ring trip deciding circuit according to claim 9, wherein when an output voltage of the detector has exceeded a maximum threshold value in the multicomparator, the state deciding means determines the off-hook state without depending on the output value of the second state latch means.

11. A ring trip deciding circuit according to claim 6, wherein a noise filter latching continuous output of said state deciding means is provided and the off-hook state is detected only when said state deciding means has continuously detected the on-hook state.

12. A ring trip deciding circuit according to claim 2, wherein the voltage comparator comprises a multicomparator having a plurality of different threshold values, the first state latch means latches a state value determined by a plurality of output values of the multicomparator, the second state latch means fetches and latches a plurality of state values of the first state latch means, the third state latch means fetches and latches a plurality of state values outputted from the second state latch means and the deciding means decides voltage change in different times detected by the ring trip detecting resistance by comparing the state values of the state latch means to detect the on-hook state and the off-hook state of a subscriber terminal unit.

* * * * *

UNITED STATES PATENT AND TRADEMARK OFFICE
CERTIFICATE OF CORRECTION

PATENT NO. : 5,402,482
DATED : March 28, 1995
INVENTOR(S) : Kazuyuki MINOHARA et al.

It is certified that error appears in the above-indentified patent and that said Letters Patent is hereby corrected as shown below:

Column 1, line 56, delete "an".

Column 2, line 57, change "subscribed" to --subcriber--.

Column 3, line 15, delete "embodiment of the present";

line 16, change "first invention" to --first embodiment of the present invention--.

Column 4, line 57, change "55 an" to --55 is an--.

Column 5, line 11, change "sown" to --shown--.

Column 6, line 28, delete "means".

line 60, change "Moreover, second" to --Moreover, the second--.

Column 7, line 1, change "tenth" to --truth--.

Column 8, line 50, change "an" to --the second--; change "second" to --present--.

Column 9, line 47, change "Lath" to --Latch--.

Column 12, line 25, change "Synchronously" to --synchronously--.

Signed and Sealed this

Fourth Day of July, 1995

Attest:

BRUCE LEHMAN

*Attesting Officer*  *Commissioner of Patents and Trademarks*